United States Patent [19]

Dani

[11] Patent Number: 5,152,446
[45] Date of Patent: Oct. 6, 1992

[54] PRESS FOR HOLDING A MAGNETIC YOKE DURING WELDING

[75] Inventor: Marco Dani, Genova, Italy

[73] Assignee: CTE Sistemi S.r.L., Genova, Italy

[21] Appl. No.: 466,338

[22] PCT Filed: Sep. 7, 1988

[86] PCT No.: PCT/EP88/00809

§ 371 Date: May 11, 1990

§ 102(e) Date: May 11, 1990

[87] PCT Pub. No.: WO89/02338

PCT Pub. Date: Mar. 23, 1989

[30] Foreign Application Priority Data

Sep. 18, 1987 [IT] Italy ................ 21969 A/87

[51] Int. Cl.⁵ ............................................. B23K 37/04
[52] U.S. Cl. .................................... 228/5.5; 228/44.3; 100/295; 269/275
[58] Field of Search ................ 100/295, 265; 269/275, 269/224, 274; 228/5.5, 106, 212, 44.3, 44.5, 49.1, 49.3

[56] References Cited

U.S. PATENT DOCUMENTS

| | | | |
|---|---|---|---|
| 1,206,656 | 11/1916 | Benedictus | 269/275 |
| 2,288,158 | 6/1942 | Ellinwood | 269/275 |
| 2,796,787 | 6/1957 | Aske | 269/274 |
| 3,873,395 | 3/1975 | Ehrlich | 100/295 |
| 4,438,911 | 3/1984 | McDougal | 269/224 |
| 4,848,639 | 7/1989 | Belanger, Jr. | 228/5.5 |

OTHER PUBLICATIONS

Western Electric "Stress Compensating Fixture for Lead Frame Bonder" Tech. Digest No. 52, Oct. 1978.

Primary Examiner—Richard K. Seidel
Assistant Examiner—James Miner
Attorney, Agent, or Firm—Notaro & Michalos

[57] ABSTRACT

A press for welding magnetic yokes comprises first and second frames movable toward and away from each other, on which there are defined respective confronting and parallel pressure surfaces (12, 35), a motive means (50) acting between the frames (11, 30) to produce the aforesaid movements, and a presser (14, 36) associated with each of the pressure surfaces (12, 35) to define a saddle-piece for receiving the yoke (3). Between at least one of the pressers (14, 36) and its respective pressure surface (12, 35) there intervening an elastically deformable pillow (39) functioning as an adjuster of the deformation under load undergone by the corresponding pressure surface (12, 35). This pillow is composed of an elastic material which has a behavior under load, within a predetermined range of specific loads, that approaches a hydrostatic behavior, that is, such that for a given increase in the deformation there corresponds a proportionally low pressure increase.

8 Claims, 4 Drawing Sheets

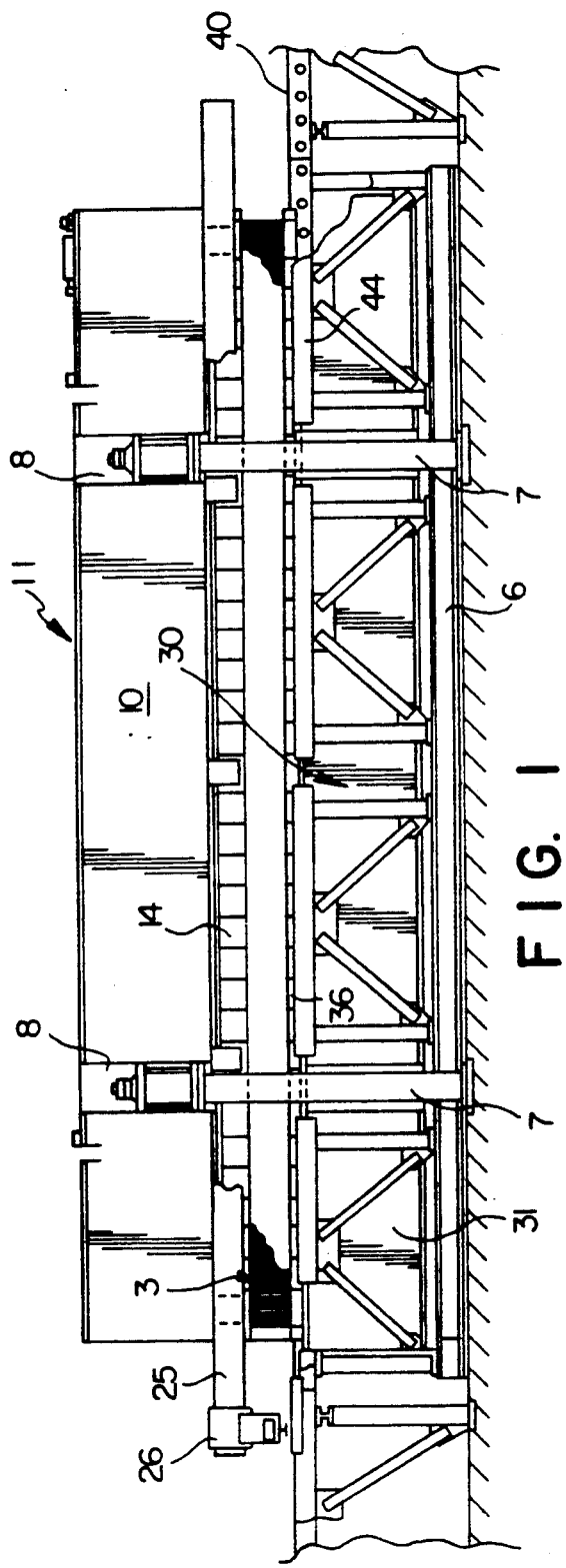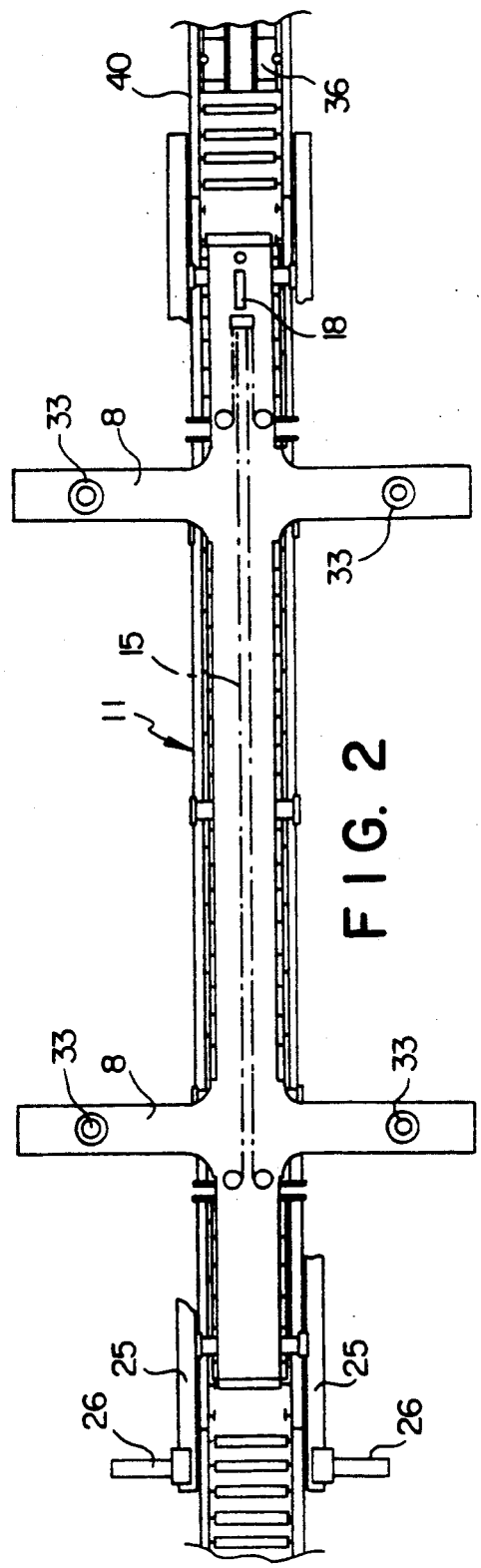

5,152,446

PRESS FOR HOLDING A MAGNETIC YOKE DURING WELDING

TECHNICAL FIELD

This invention relates to a press for welding magnetic yokes, being of a type which comprises first and second frames movable toward and away from each other and having respective confronting pressure surfaces, a motive means acting between said frames, and a presser associated with each of the pressure surfaces, said pressers defining a saddle piece for receiving said yoke.

The magnetic yokes for which the machine according to this invention is intended are formed by joining together, as by welding, two half-yokes in superimposed relationship. Each half-yoke comprises a pack of about 1800 core sheets having a roughly semicircular shape and each being 5 mm thick, to provide an overall length of the half-yoke of about 9 m. The half-yokes must then be welded together to provide a cylindrical yoke. Welding is carried out along two opposite generatrix lines of the yoke outer surface, at the mating surfaces of the half-yokes. The welding is carried out simultaneously along both generatrix lines to avoid distorting the yoke.

With the weld completed, no appreciable gap should remain between the mating surfaces of corresponding sheets in the two half-yoke packs. It is for this reason that the two half-yoke are held pressed against each other during the welding process. The pressure force is applied to the half-yokes at suitable seats formed around the outer contours of the core sheets.

Since the half-yokes are made up of a large number of superimposed sheets, the pressing load requires to be applied across the entire length of a yoke being processed with the highest possible uniformity, meaning that the pressure surfaces of the press employed and the pressers acting on the pressure pads formed on the sheets are, as far as feasible, to undergo no deformations under load.

BACKGROUND ART

To meet the demand for arrangements to have magnetic yokes correctly welded, the background art has proposed that the press distortion be minimized by using frames which are made as rigid as possible and driven by a large number of hydraulic cylinders placed at short intervals from one another. As an example, a prior press for welding yokes with the above-specified dimensions has 13 hydraulic cylinders which are arranged to act on the pressers with the interposition of respective metal blocks effective to spread the pressing load over the relevant pressure area of the corresponding cylinders.

Thus, the design trend is toward "segmenting" the press into sections of reduced length which can be more easily handled versus induced deformations.

In practice, this prior press operates as if the pressers acting on the half-yokes were split into contiguous sections correspondingly with the areas affected by the respective cylinders, thereby achieving decreased deformation of a yoke being pressed by virtue of a smaller spacing of the cylinders.

Each cylinder, moreover, is suspended above the yoke by means of a portal-type frame the pillars whereof extend upright from the press bed.

A first drawback of this prior press design is that the uniformity of the half-yoke pressing is directly dependent on the machining accuracy of the various press components as well as, of course, on its overall rigidity, particularly as concerns the pressure surfaces and pressers, and on the various hydraulic cylinders applying an even pressure force. In view of the considerable length dimension of a yoke, it is evident that it is quite difficult to ensure uniform pressing conditions over the entire length of the half-yokes.

Further, since welding along the two opposed generatrix lines of the yoke is a time-consuming operation, it becomes necessary to ensure that the pressure inside the hydraulic cylinders be kept throughout its duration within very narrow limits of variation, possibly by providing pressure accumulators, automatically driven manostat-regulated control units, or some like ancillary equipment.

But not even by providing such items of equipment can an initiated processing step be discontinued, such as at the end of the workday, because no provision is made to ensure that the hydraulic cylinders will keep the necessary pressure on the yoke throughout the break. In addition, such items of ancillary equipment are themselves a source of problems on account of their requiring adjustment and maintenance, and being liable to failure, not to mention the problems of operational continuity brought about by possible power outages.

A further drawback is that the hydraulic cylinders are mounted directly above the yoke being processed, thereby any loss or leakout of hydraulic fluid is apt to foul the yoke to be welded and cause welding problems.

Another problem that accompanies this prior press comes from the dense presence of the pillars which support the cylinders on either sides of the frames. Such pillars greatly hinder access to the yoke under the press, and to the welder heads.

Furthermore, the pillars are in the way of the operators checking that the weld has been correctly made.

The problem underlying this invention is to provide a press for welding magnetic yokes, which is so constructed as to be free of the drawbacks affecting the above-discussed background art.

DISCLOSURE OF THE INVENTION

This problem is solved according to the invention by a press as indicated being characterized in that interposed between at least one of said pressers and its respective pressure surface is an elastically deformable pillow operative as an adjuster of the deformation undergone by its respective pressure surface under load, said pillow being composed of an elastic material whose behavior approaches, when subjected to a load within a specific load range, a hydrostatic behavior.

BRIEF DESCRIPTION OF THE DRAWINGS

The features and advantages of a press according to the invention will be more clearly understood by making reference to the following detailed description of a preferred, though not exclusive, embodiment thereof, to be taken by way of example and not of limitation in conjunction with the accompanying drawings, where:

FIG. 1 is an elevation view of a press according to this invention;

FIG. 2 is a top plan view of the press of FIG. 1;

BEST MODE FOR CARRYING OUT THE INVENTION

Figure 3:
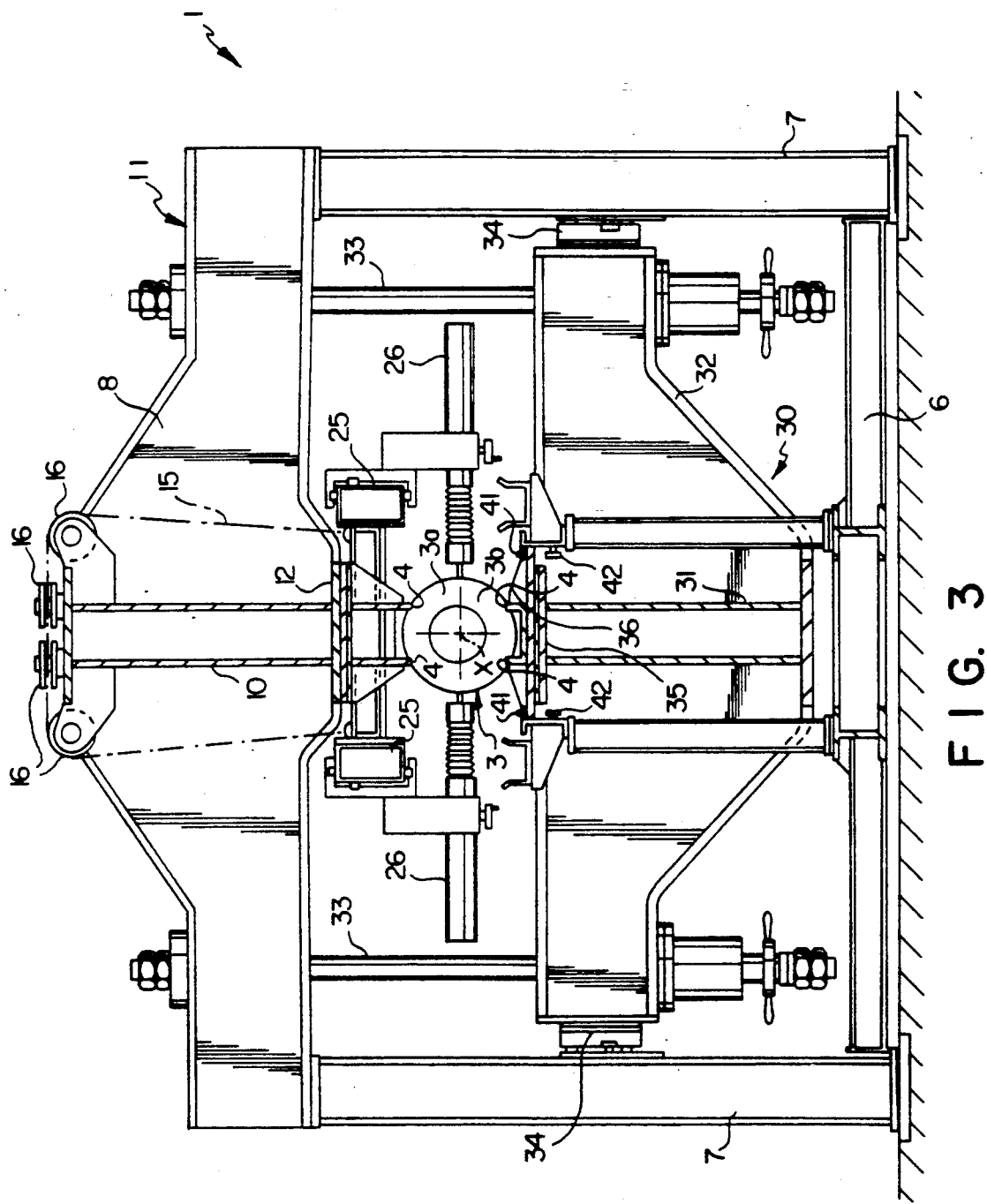
FIG. 3 is a cross-sectional view showing, to an enlarged scale, the same press as in the preceding Figures.
Figure 5:
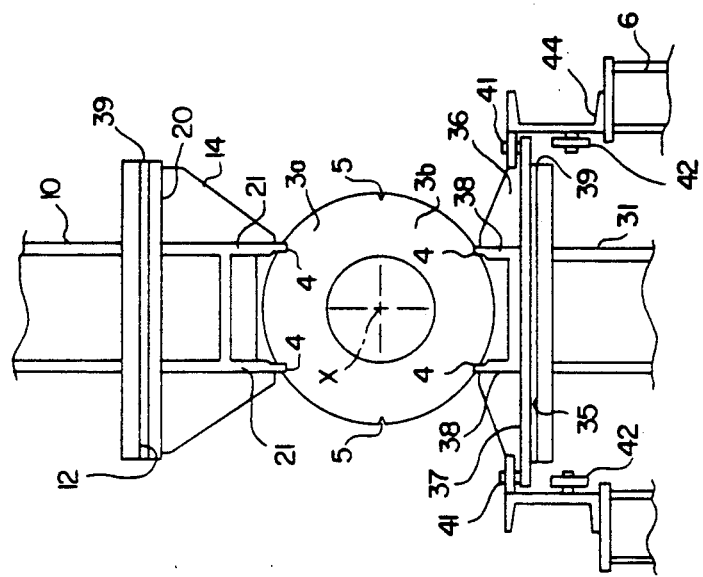
FIG. 5 is a sectional view showing diagramatically an electromagnetic yoke being pressed on the press of the preceding Figures.

In the drawing views, the reference numeral 1 comprehensively designates a press for welding two half-yokes or yoke parts 3a,b, the one on top of the other, to form a magnetic yoke 3 having an axis X. Each half-yoke consists of a pack of core sheets shorn to a semiannular pattern and having formed on its outside diameter two angularly spaced-apart notches 4 and two end bevels adapted to provide, with the half-yokes in superimposed relationship, respective welding seats or pads 5.

The press 1 comprises a bed 6 with a major longitudinal dimension along the axis X. Upstanding from either longitudinal sides of the bed 6 are two pillars 7, with the corresponding pillars on opposed sides interconnected by a respective crosspiece 8.

The crosspieces 8 carry a box-type beam 10 extending along the direction of the axis X and forming, in combination with the pillars and the bed, a first fixed frame of the press 1. This first frame is generally indicated at 11.

The locations of the pillars 7 and the crosspieces 8 relatively to the beam 10 are such that, under a uniformly applied load, the beam 10 will be deformed to an equal minimum deflection at the middle and the ends.

A substantially flat pressure surface 12 is defined on the underside of the beam 10, i.e. the side facing the half-yoke 3a.

An upper presser 14 is suspended from the first frame 11, at the pressure surface 12, by means of a cable system 15 trained around sheaves 16.

A linear motor, such as a hydraulic cylinder 18, is mounted on the topside of the beam 10 and acts on the cable system 15 to either raise the presser 14 up toward the pressure surface 12 or release it toward a remote position from said pressure surface, as explained in detail herein below.

The presser 14 is formed of a substantially flat table 20 which is held parallel to the pressure surface 12 and has two parallel ribs 21 made rigid perpendicularly to it, the ribs being first or upper saddle shaped yoke engaging means adapted to engage in respective pressure seats or pads defined by the notches 4 in the upper half-yoke 3a. The floating suspension mount of the upper presser 14 as described above contributes toward allowing wide tolerances in the setting of a yoke to be welded on the press 1.

Mounted on either sides of the presser 14 are respective guides 25 providing a runway for a respective welder head 26, known per se, which operates on the impulse TIG process principle. Mounting the guides 25 directly onto the upper presser 14 results in the paths of the welder heads 26 and the welding pads 5 becoming inherently aligned, albeit in a coarse manner.

A second frame, generally indicated at 30, is mounted on the press 1 in a movable manner relatively to the first frame 11.

The second frame 30 comprises a beam 31 which lies parallel to and is substantially identical of the beam 10 of the first frame, and a pair of crosspieces 32 rigid with the beam 31 and located at the crosspieces 8.

The frame 30 is suspended from the frame 11 by means of ties 33 extending through respective crosspieces 8, 32, and is guided along the pillars 7 by means of shoes 34 provided at the free ends of the crosspieces 32.

The beam 31 has a substantially flat topside defining a pressure surface 35 which confronts and is parallel to the pressure surface on the beam 10. The pressure surface 35 is intended to receive a lower presser 36 which bears on it and is similar in design to the upper presser 14, also formed of a substantially flat table 37 on which two parallel ribs 38 stand perpendicularly upright which form second or lower saddle shaped yoke engaging means adapted to engage in respective pressure pads defined by the notches 4 of the lower half-yoke 3b. It is preferred that one of the two pressers 14, 36 be made stiffer longitudinally to provide a reference for the core sheets which make up the yoke 3.

The lower presser 36 is guided for movement along a roller way or roller conveyer 40 extending in continuation of both of the opposed axial ends of the press 1.

Preferably, each press would include two identical pressers 36 which are driven from winches, not shown, along the roller way 40 and interconnected such that with one presser 36 brought to overlie the pressure surface 35 of the beam 31, the other presser 36 is brought out of the press 1 to discharge a welded yoke or pick up a fresh set of half-yokes for welding.

For their movement within the press 1, the pressers 36 are equipped with idler wheels 41 which are mounted laterally along the table 37. Additional idler wheels 42 are mounted on a runway 44 extending upright from the bed 6 into the press 1 in continuation of the roller way 40.

Figure 6:
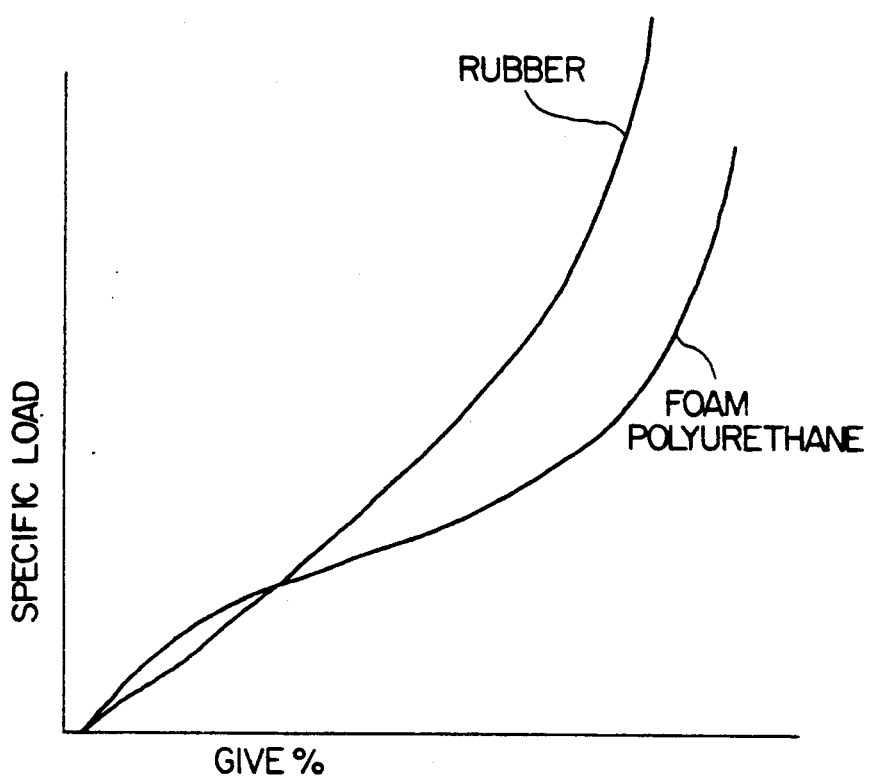
FIG. 6 is a graph illustrating the elastic properties of the material used for making the deformable pillows of the press according to the invention.

Interposed between each pressure surface 12, 35 and the respective pressers 14, 36 is an elastically deformable pillow 39, functioning as an adjuster of deformation under load for the respective pressure surfaces. The pillows 39 are each formed of a closed-cell foam polyurethane sheet attached to the corresponding pressure surface. This material has an elastic curve as shown in FIG. 6, where plotted on the abscissa is the give percent, and on the ordinate the specific load applied to the material, it being characterized by an intermediate portion of smaller gradient than conventionally used elastic materials (FIG. 6 shows the elastic curve of rubber for comparison).

This means that in the working area, this material will exhibit a relatively high give for relatively small increases of the specific load.

Thus, the behavior of foam polyurethane in the working area approaches a hydrostatic behavior in the sense that, when compressed between two surfaces liable to undergo deformation, however slight, the material will transfer a nearly uniform pressure to all the points across said surfaces.

The provision of the pillows 39 makes it possible to accommodate maximum longitudinal deformations under load (deflections) of the frames 11, 30 equal approximately to 0.4–0.5 mm, under a pressing force on the half-yokes of about 396 t. Such deformations would appear at the middle and the ends of the beams 10, 31, and compensated for by the elastic deformation of the pillows 39.

Actual tests have revealed an average elastic contraction under load equal to about 35% in the thickness of the pillows 39, which is the equivalent of a thickness reduction of about 7 mm from the no-load condition. In this load condition, the pressure variation, as measured along the yoke, was on the order of 5%.

The latter value proves to be more than appropriate to provide an adequate pressure between corresponding core sheets of the half-yokes to confine the gaps between opposite sheets after welding within the accepted tolerence limits.

In the example just described a pillow 39 is interposed between each pressure surface 12, 35 and a respective presser 14, 36; however, it is envisaged that a single pressure surface may be provided with an elastically deformable pillow. In this case, the presser contacting the pressure surface with no pillow 39 should be able to yield elastically sufficiently to accommodate the deformations of its respective frame 11, 30. This modified embodiment of the press 1 is designed to limit possible torsional deformations of the yoke, while allowing for limited longitudinal deformations.

Figure 4:
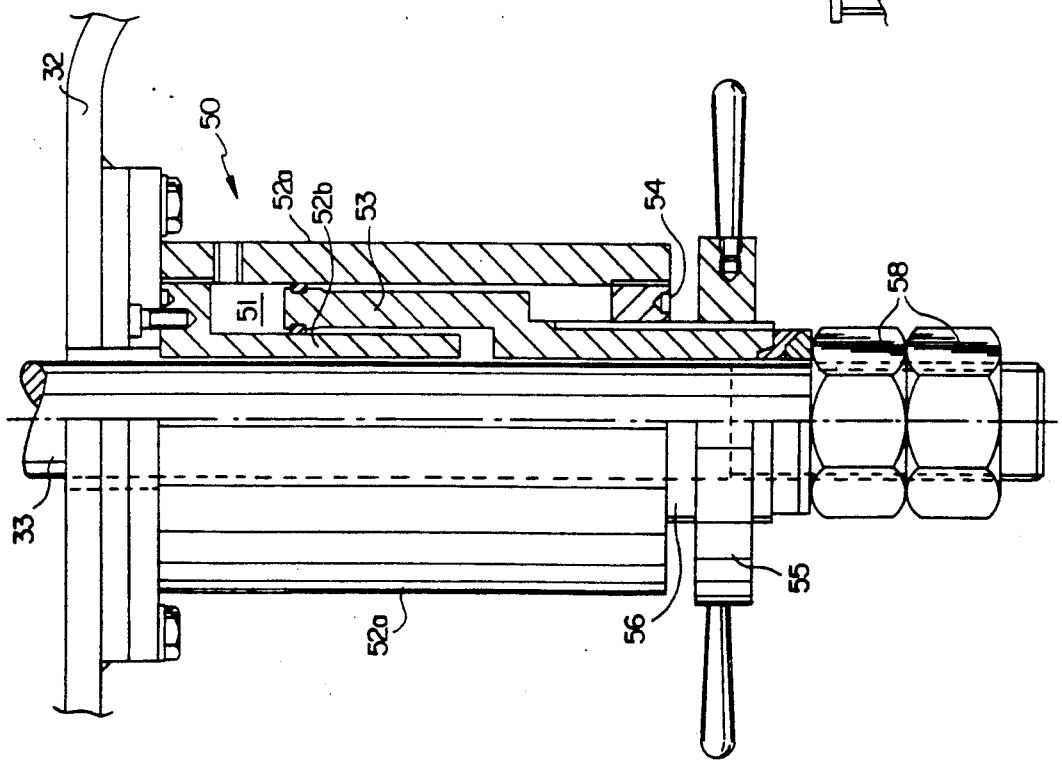
FIG. 4 is an enlarged scale part-sectional detail view of a press according to the invention.

With reference to FIGS. 3 and 4, between each tie 33 and the lower frame 30, there acts as a motive means a hydraulic cylinder 50 which is mounted on a corresponding tie 33 coaxially therewith.

Each of the cylinders 50 has an annular chamber 51 defined between two coaxial cylindrical chests 52a, b attached to a corresponding crosspiece 32, and a tubular plunger 53 tightly slidable inside the chamber 51.

The outer cylindrical chest 52a has a flanged free end 54 constituting a shoulder for a ring nut 55 threaded onto a threaded outer rod 56 of the tubular plunger 53.

The corresponding tie 33 is engaged slidingly inside the inner cylindrical chest 52b and the piston 53, and is provided with end stops consisting, for example, of nuts and locknuts 58. Between the end stops 58 and the corresponding end of the plunger 53, there is interposed a ball joint effective to relieve the tie 33 of bending stresses.

With the press 1 at rest, that is prior to starting the cycles for loading, pressing, and welding the two half-yokes 3a, b into the yoke 3, the lower frame 30 bears on adjustable height supports, not shown, which stand upright on the bed 6, the hydraulic cylinders 50 being in a retracted state; one of the two lower pressers 36 will be at the pressure surface 35, and bear on the idler wheels 41 and 42 of the runway 44, whereas the other lower presser 36 will be on the roller way 40 outside the press 1 and ready to receive the two superimposed half-yokes 3a, b. The upper presser 14 will be in a raised position toward the upper pressure surface 12, under the bias action of the cable system 15, whereas the welder heads 26 will be at their bottom travel limit, at one end of the press.

With this setup, the operating cycle of the press 1 is as follows.

The lower half-yoke 3b is laid onto the lower presser 36 with the pressure pads defined by the notches 4 engaged by the ribs 38. The lower half-yoke 3b has been loaded onto the presser 36 by some suitable conventional means, e.g. a bridge crane. Using such like means, the upper half-yoke 3a is laid onto the lower half-yoke 3b in superimposed relationship therewith.

The resulting yoke 3, now ready for welding, is then drawn by the winch drive system provided for operating the pressers 36 along the roller way 40 into the press 1, at the beam 31.

At the same time, the lower presser 36, which was located inside the press, is pulled out of the latter and set up for loading a fresh yoke 3 to be welded.

Then the upper presser 14 is lowered onto the upper half-yoke 3a so as to bring the ribs 21 to engage in the pressure pads defined by the notches 4.

The yoke 3 is then subjected to the pressing step by supplying fluid pressure into the annular chambers 51 of the four hydraulic cylinders 50.

The moving frame 30 completes a first idle stroke to bring the pressure surface 35 into contact with the lower presser 36 and proceeds then toward the upper frame 11, lifting the presser 36 off the runway 44.

Thus, the upper presser 14 will contact the pillow 39 provided on the pressure surface 12 of the fixed upper frame 11.

At this time, by supplying additional pressurized fluid to the cylinders 50, the yoke 3 pressing step proper takes place. The foam polyurethane sheets constituting the pillows 39 are compressed by approximately 35%. This deformation value falls within the working range of foam polyurethane where it tends to behave hydrostatically.

For this deformation value there corresponds an overall pressing force of about 396 t with a yoke of the size specified above.

On achieving the required pressing force, the operation of the hydraulic cylinders is stopped automatically by a control, known per se.

Since the subsequent welding operations may last several hours, and it being anticipated that the same may be interrupted for various reasons and resumed later, with intervals between an interruption and the resumption which may have durations on the order of hours or even one or more days, the hydraulic cylinders would be locked in the extended state achieved during the pressing step by threading down the ring nut 55 onto the threaded rod 56 of the tubular plunger 53 until said ring nut 55 abuts the flanged free end 54 of the outer cylindrical chamber 52A.

The operator will lock the four cylinders 50 manually by threading down the corresponding ring nuts 55, being aided in the task by the provision of gripping lugs purposely formed thereon.

In this way, the correct pressing force can be maintained indefinitely by the mechanical locking of the hydraulic cylinders, independently of the operation of the remaining machine fitments, including the ability to supply fluid under pressure to the cylinders 50. Actually, after the ring nuts 55 have been tightened down, the fluid pressure to the cylinders 50 may be relieved.

Thus, the yoke 3 will be kept pressed even in the event of power outages, working time breaks, shifts, etc.

On completion of these operations, the welder heads 26 are operated conventionally.

It remains to be observed that the operator enjoys, throughout the welding step, full access to and inspectability of the weld, and is enabled to carry out unrestrictably any necessary checks.

On completion of the welding step, fluid pressure is again supplied to the hydraulic cylinders 50 in order to enable the ring nuts 55 to be loosened. These should be threaded out enough to permit the frame 30 to come to rest onto the specially provided adjustable-level supports on the bed.

Then by appropriately exhausting the cylinders 50, the moving frame 30 is lowered to bring the presser 36 back onto the runway 44.

The welded yoke 3 is drawn, thereafter, out of the press along the roller way 40, together with the presser 36 on which it is rested, while the other presser 36 and a fresh yoke for welding under the press 1 are simultaneously drawn in.

Of the advantages afforded by the press of this invention, of special value have shown to be its simple construction, the fact that no accurate alignment is required to set up the yoke under the press, and the fact that the yoke may be left in the pressed state for an indefinite length of time with no power being supplied to it or no fluid pressure to the cylinders 50.

Also advantageous is the unrestricted accessibility to the yoke during the welding operations, and the fact that any leakouts of oil from the cylinders 50 are prevented from getting to a yoke being welded and fouling it.

I claim:

1. A press for welding together first and second yoke parts (3a, 3b) to form a magnetic yoke (3) which is on the order of about 9 m long, the press comprising first and second frames (11, 30) movable toward and away from each other and having respective confronting pressure surfaces (12,35), a plurality of motive means (50) acting between said frames at a plurality of spaced locations on said frames, a presser (14, 36) associated with each of the pressure surfaces (12, 35), one of said pressers comprising first yoke engaging means (21), said first yoke engaging means defining a saddle means for engaging the first yoke part (3a), the other of said pressers comprising second yoke engaging means (38), said second yoke engaging means defining a second saddle means for engaging the second yoke part (3b), an elastically deformable pillow (39) interposed between at least one of said pressers (14, 36) and its respective pressure surface (12, 35) and operative as an adjuster of a deformation undergone by this respective pressure surface (12, 35) under load, said pillow (39) being composed of an elastic material whose behavior approaches, when subjected to a load within a specific load range, a hydrostatic behavior.

2. A press according to claim 1, wherein said pillow (39) comprises a sheet of closed-cell foam polyurethane.

3. A press according to claim 1 wherein a pillow (39) is interposed between each of the pressers (14,36) and its respective pressure surface (12,35).

4. A press according to claim 1, wherein said frames (11,30) are interconnected by ties (33), intervening means between at least one of said frames (11,30) and said ties (33) (54–56) for mechanically locking said frames in a pressing state onto said yoke.

5. A press according to claim 4, including four ties (33) arranged in pairs along opposed longitudinal sides of said frames (11,30) and being so distributed as to equalize the deformation under a uniformly distributed load undergone by each frame (11,30) at the ends and the middle of each frame.

6. A press according to claim 4 wherein said motive means comprises a hydraulic cylinder (50) acting on each tie (33), said cylinders (50) having a coaxial tubular plunger (53) on the corresponding tie (33) slidable within a chest (52a,b), each plunger being formed with a threaded rod (56) on which a ring nut (55) is engaged, said ring nuts removably abutting said chests (52a) to mechanically lock said frames (11,30) in a pressing state on said yoke (3).

7. A press according to claim 6, wherein said frames overlie each other, and wherein said cylinders (50) are arranged to act on a lower frame (30) of said press.

8. A press according to claim 1, wherein said elastic material is selected to deflect by approximately 0.4 to 0.5 mm under a total pressure of about 396t, applied to the yoke (3) whereby a pressure variation of only about 5% occurs along the length of the yoke.

* * * * *